United States Patent [19]
Kikuchi et al.

[11] Patent Number: 5,575,368
[45] Date of Patent: Nov. 19, 1996

[54] FLUID CLUTCH

[75] Inventors: Yasuhei Kikuchi; Mitsuaki Hatori; Satoshi Tsuyuki, all of Shizuoka, Japan

[73] Assignee: Usui Kokusai Sangyo Kaisha Ltd., Japan

[21] Appl. No.: 404,428

[22] Filed: Mar. 15, 1995

[30] Foreign Application Priority Data

Mar. 19, 1994 [JP] Japan .................................. 6-074113

[51] Int. Cl.⁶ .................................................. F16D 31/00
[52] U.S. Cl. .................... 192/58.3; 192/58.61; 192/58.7; 192/58.91; 192/59; 192/61
[58] Field of Search ................................ 192/58.3, 58.5, 192/58.61, 58.6, 58.7, 58.91, 59, 61

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,642,105 | 2/1972 | Kikuchi | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,893,555 | 7/1975 | Elmer | 123/44.12 |
| 3,964,582 | 6/1976 | Mitchell | 192/58 B |
| 4,188,785 | 2/1980 | Ando et al. | 192/58.91 X |
| 4,214,652 | 7/1980 | Quenneville | 192/61 X |
| 4,228,880 | 10/1980 | Gee | 192/58.61 |
| 4,238,016 | 12/1980 | Yoskida et al. | 192/58 B |
| 4,246,995 | 1/1981 | Gee | 192/58.61 |
| 4,281,750 | 8/1981 | Clancey | 192/58 B |
| 4,344,338 | 8/1982 | Hattori et al. | 192/61 |
| 4,403,684 | 9/1983 | Haeck | 192/58 B |
| 4,505,367 | 3/1985 | Martin | 192/58 B |
| 4,629,046 | 12/1986 | Martin | 192/58 B |
| 4,650,045 | 3/1987 | Weible et al. | 192/58.61 |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |

(List continued on next page.)

FOREIGN PATENT DOCUMENTS

| | | | |
|---|---|---|---|
| 54-25581 | 8/1979 | Japan . | |
| 55-33924 | 3/1980 | Japan | 192/61 |
| 55-76226 | 6/1980 | Japan . | |
| 57-1829 | 1/1982 | Japan | 192/82 T |
| 57-167533 | 10/1982 | Japan . | |
| 57-179431 | 11/1982 | Japan . | |
| 59-27452 | 7/1984 | Japan . | |
| 62-124330 | 6/1987 | Japan . | |
| 62-194038 | 8/1987 | Japan | 192/58 B |
| 63-182332 | 11/1988 | Japan . | |
| 3-194221 | 8/1991 | Japan | 192/61 |

*Primary Examiner*—Andrea L. Pitts
*Attorney, Agent, or Firm*—Anthony J. Casella; Gerald E. Hespos

[57] ABSTRACT

A fluid clutch comprising a driving section, a rotational shaft rotated by the driving section, a driving disk driven rotationally by the rotational shaft, a casing containing the disk and rotatable around the rotational shaft as a center, a partitioning member disposed in the casing for dividing the inside of the casing into a torque transmission chamber and an oil reservoir in which an oil is supplied from the oil reservoir to the torque transmission chamber thereby transmitting the torque from the driving disk to the casing, wherein the fluid clutch comprises a pump mechanism that rotates due to a difference between the number of rotations of the rotational shaft and the number of rotation of the casing, a first flow channel for sucking the oil in the torque transmission chamber by the pump mechanism and a second flow channel for sending the oil pressurized by the pump mechanism into the oil reservoir, a valve member for opening and closing a supply aperture formed in the partitioning member for causing the oil in the oil reservoir chamber to flow into the torque transmission chamber, and a solenoid type actuator for operating the valve member.

5 Claims, 7 Drawing Sheets

OTHER PUBLICATIONS

| | | | |
|---|---|---|---|
| 4,699,258 | 10/1987 | Johnston et al. | 192/58 B |
| 4,718,378 | 1/1988 | Child | 123/41.12 |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,924,989 | 5/1990 | Filderman | 192/61 X |
| 4,930,458 | 6/1990 | Takikawa et al. | 123/41.12 |
| 4,987,989 | 1/1991 | Kennedy et al. | 192/58.61 |
| 5,004,085 | 4/1991 | Taureg | 192/58 B |
| 5,018,612 | 5/1991 | Takikawa et al. | 192/58 B |
| 5,025,906 | 6/1991 | O'Neil et al. | 192/58.61 |
| 5,090,533 | 2/1992 | Inoue . | |
| 5,101,949 | 4/1992 | Takikawa et al. . | |
| 5,109,965 | 5/1992 | Inoue . | |
| 5,119,920 | 6/1992 | Inoue . | |
| 5,125,491 | 6/1992 | Takikawa et al. . | |
| 5,139,125 | 8/1992 | Takikawa et al. | 192/58 B |
| 5,152,384 | 10/1992 | Brown | 192/58.61 |
| 5,232,074 | 8/1993 | Watanabe . | |

FLUID CLUTCH

BACKGROUND OF THE INVENTION

1. Field of the Invention

The present invention concerns a fluid clutch for transmitting a driving torque of a driving disk to a casing by an oil supplied to a torque transmission chamber and, more in particular, it relates to a fluid clutch for controlling the rotation of a cooling fan for an automobile engine attached to the casing.

2. Description of the Prior Arts

A known liquid clutch has a structure, for example, that the inside of a casing is divided by a partition plate into a torque transmission chamber and an oil reservoir, a driving desk rotatably is contained in the torque transmission chamber and disposed such that it is driven rotationally by a driving section, an oil in the oil reservoir is supplied from a supply control aperture formed to the partition plate to the torque transmission chamber, and the oil in the torque transmission chamber is returned by way of a dam disposed to the inner circumferential surface of the tightly sealed casing opposed to the outer circumferential surface of the driving disk and a discharge channel in communication with the dam to the oil reservoir chamber thereby controlling the amount of the oil in a torque transmission gap between the driving disk and the inner wall of the torque transmission chamber.

In the liquid clutch of the aforementioned type, a driving torque of the driving disk is transmitted to the casing by the oil supplied from the oil reservoir to the torque transmission chamber, and the fan attached to the casing is rotated to cool, for example, an automobile engine. As the oil, a silicon oil having a high viscosity is used generally for attaining the torque transmission function.

However, the fluid clutch of the prior art involves the following problems.

That is, when an engine is restarred in a state where a great amount of the oil is present in the torque transmission chamber or upon quick acceleration during running, abrupt the rotation speed of is caused, the casing on the driven side (cooling fan) is also increased quickly although only for a while by the oil in the torque transmission chamber accompanying the acceleration of the driving disk on the driving side. The phenomenon is generally referred to as "co-rotating" phenomenon which has to be prevented since this causes fan noises or unpleasant feeling caused thereby and also increases a fuel cost.

The "co-rotating" phenomenon in the fluid clutch of the prior art upon restarting of the engine occurs more remarkable as the amount of the oil in the torque transmission chamber is increased. As means for overcoming the problem, it has been proposed, for example, in Japanese Patent Publication Sho. 63-21048 to introduce the oil flowing out of the discharge control aperture of the partition plate once in a diametrically opposite side and then supplied into the torque transmission chamber.

In such a structure, when the engine stops in a state where the oil is scarcely present in the torque transmission chamber and a great amount of oil is present in the oil reservoir, since the oil does not flow from the oil reservoir to the torque transmission chamber, the "co-rotating" phenomenon does not occur upon restarting of the engine. However, this structure has no effect for preventing the "co-rotating" phenomenon upon restarting of the engine when it stopped in such a situation that a great amount of oil is present in the torque transmission chamber or upon quick acceleration during running.

SUMMARY OF THE INVENTION

An object of the present invention is to propose a fluid clutch capable of preventing the occurrence of "co-rotating" phenomenon under various situations as described above and reducing fan noises and improving the fuel cost, as well as capable of transmitting the torque in an optimum state from the driving disk to the casing corresponding to the various kinds of driving conditions.

The foregoing object can be attained in accordance with the present invention by incorporating a pump mechanism and a flow rate control mechanism and the feature of the present invention resides in a fluid clutch comprising a driving section, a rotational shaft rotated by the driving section, a driving disk driven rotationally by the rotational shaft, a casing containing the driving disk and rotatable around the rotational shaft as a center and a partitioning member disposed in the casing for dividing the inside of the casing into a torque transmission chamber and an oil reservoir, in which an oil is supplied from the oil reservoir to the torque transmission chamber, and the torque is transmitted from the driving disk to the casing, wherein the fluid clutch comprises a pump mechanism that rotates due to a difference between the number of rotation of the rotational shaft and the number of rotation of the casing, a first flow channel for sucking the oil of the torque transmission chamber by the pump mechanism, a second flow channel for sending the oil pressurized by the pump mechanism into the oil reservoir, a valve member for opening and closing a supply aperture formed in the partitioning member for flowing the oil in the oil reservoir into the torque transmission chamber and a solenoid type actuator for operating the valve member. In a preferred embodiment according to the present invention, a dam mechanism is disposed to the inner circumferential surface of the casing for sending the oil toward the pump mechanism in the first flow channel, an auxiliary oil reservoir is disposed to the outer circumferential surface of the casing for storing the oil to be sent into the pump mechanism, the solenoid type actuator is secured to the outer surface of the casing and supplied with electric current by way of a slip ring, and the solenoid type actuator is secured directly to a base body such as a vehicle body or an engine block, or indirectly by way of a connection member such as a stay or bracket to the base body.

In the present invention, the oil in the torque transmission chamber is sucked and discharged into the oil reservoir by the pump mechanism that rotates due to the difference between the number of rotation of the rotational shaft and the number of rotation of the casing, and the oil in the oil reservoir is compulsorily circulated into the torque transmission chamber by way of the valve member. As the control means for the valve member, a system of controlling the solenoid type actuator by using a sensor detecting, for example, temperature of cooling water in the driving section, the number of rotation of the engine, the number of rotation of the casing or the opening degree of the throttle, and a control unit such as a microcomputer can be used. In a case if a control signal is not outputted from the sensor and the control unit, the valve member is closed to shut off the supply channel in communication from the oil reservoir to the torque transmission chamber. When the control signal is outputted, a switching valve is opened to supply the oil through the supply aperture from the oil reservoir into the torque transmission chamber, the oil in the torque transmission chamber is sucked form the first flow channel by the pump mechanism, and the oil pressurized by the pump mechanism is circulated so as to pass through the second flow channel and then return to the oil reservoir again.

Accordingly, since the oil passes through the supply aperture and is sent to the torque transmission chamber when the supply aperture is opened by operating the valve member by the solenoid type actuator, the number of the rotation of the casing (cooling fan) is increased. On the other hand, when the valve member is operated by the solenoid type actuator to close the supply aperture, the amount of the oil sent from the oil reservoir into the torque transmission chamber is decreased or reduced to zero, so that the number of rotation of the casing (cooling fan is decreased.

Particularly, in the present invention, since the oil in the torque transmission chamber can be sucked rapidly by the pump mechanism, "co-rotating" phenomenon on the side of the casing can be prevented not only upon restarting of the engine but also upon quick acceleration during running.

Further, since the oil is discharged by the incorporated pump mechanism, the discharging performance is large and the discharging performance is further increased, particularly, if the dam mechanism is provided additionally, so that the "co-rotating" phenomenon on the side of the casing can be prevented not only upon restarting of the engine but also upon quick acceleration during running, so that the fan noises can be reduced and fuel cost can be improved.

Furthermore, since the auxiliary oil reservoir is provided, even if the valve member is opened and a great amount of oil is caused to flow into the torque transmission chamber, the oil enters from the discharge channel to the auxiliary oil reservoir, so that the amount of oil in the torque transmission chamber is reduced to prevent the occurrence of "co-rotating" phenomenon that would otherwise occur just after the restarting of the engine can be prevented more effectively.

In the present invention, since the supply of the oil is controlled based on the output signal from the sensor for detecting, for example, the temperature of the cooling water in the driving section, the number of rotation of the engine or the number of rotation of the casing, the amount of oil can be controlled accurately and effectively thereby enabling to transmit the torque from the driving disk to the casing in an optimum state corresponding to various kinds of driving conditions.

DETAILED DESCRIPTION OF PREFERRED EMBODIMENTS

Figure 1:
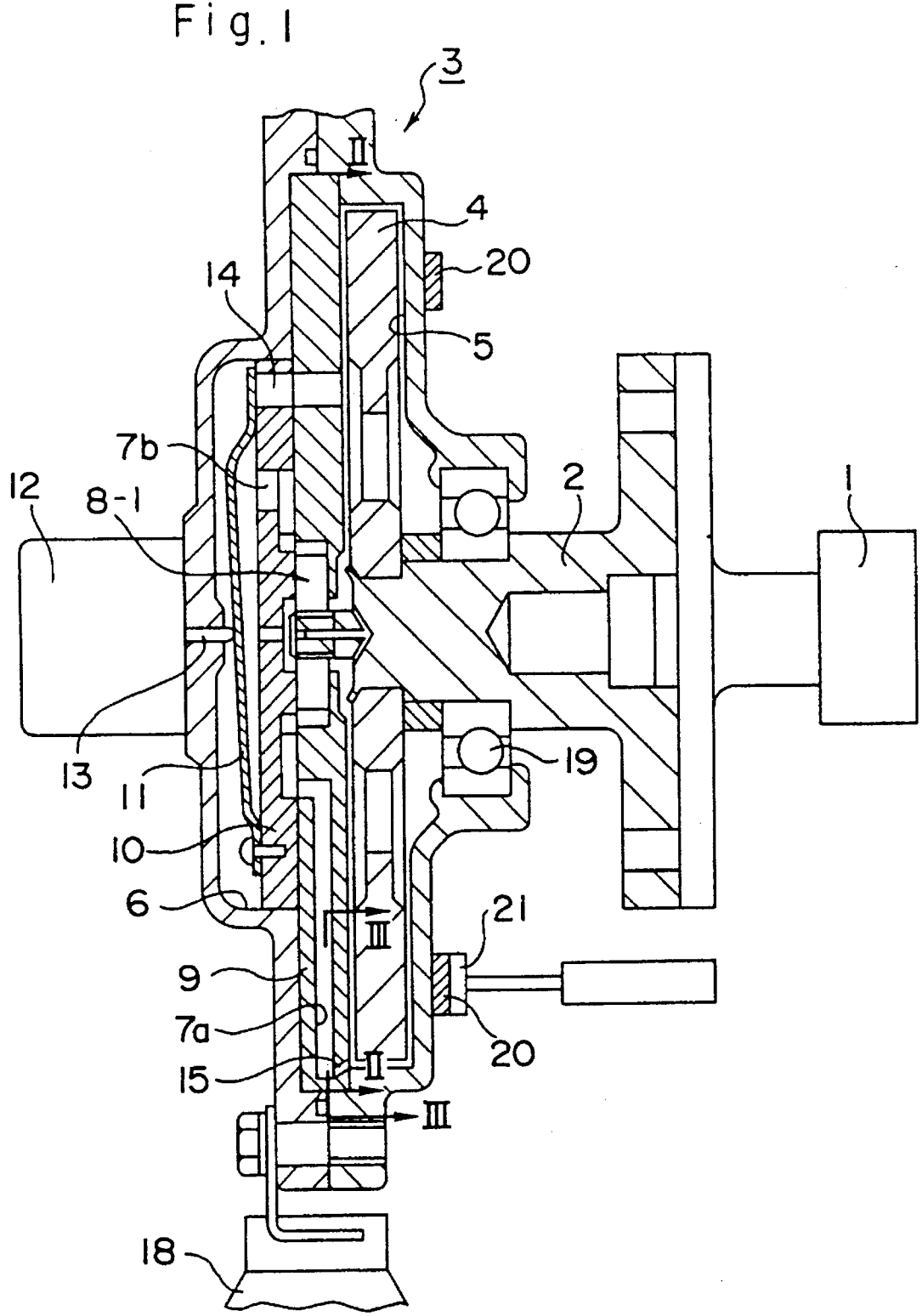
FIG. 1 is a partially cut away side elevational view in vertical cross section of a preferred embodiment of an fluid clutch.
Figure 2:
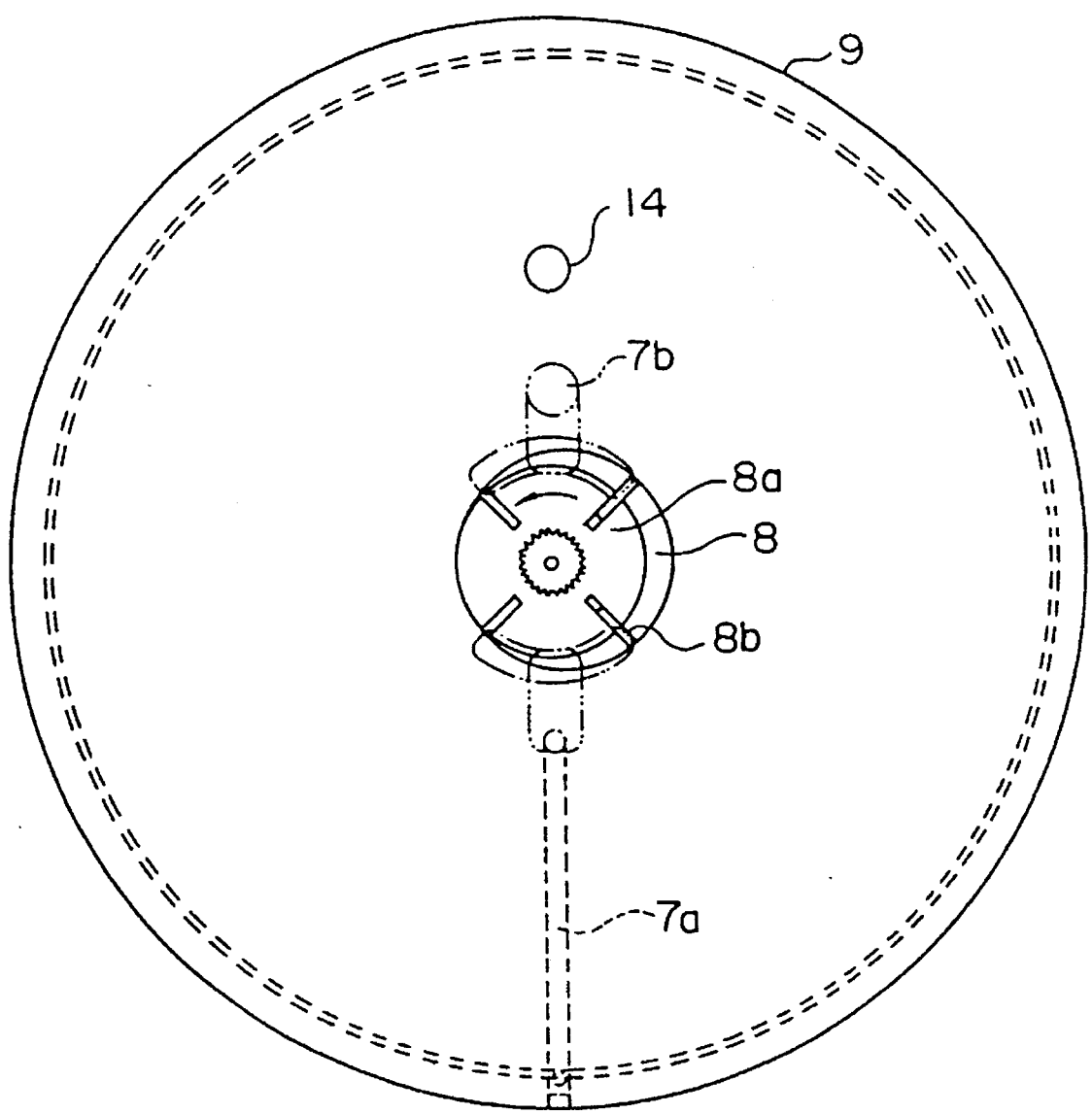
FIG. 2 is a front elevational view taken along lines II—II in FIG. 1.
Figure 3:
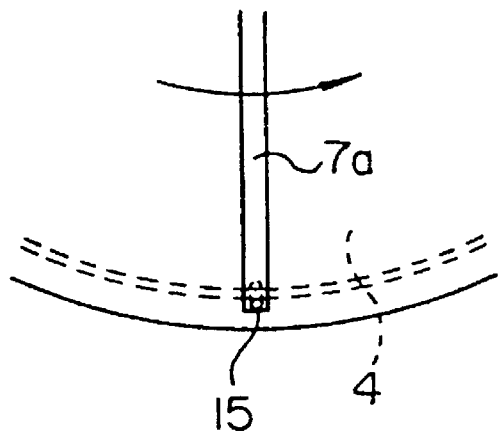
FIG. 3 is an enlarged front elevational view in vertical cross section taken along lines III—III in FIG. 1.

In FIG. 1 to FIG. 3 are shown a driving section 1, a rotational shaft 2, a casing 3, a driving disk 4, a torque transmission chamber 5, an oil reservoir 6, a first flow channel 7a second flow channel 7b, a pump mechanism 8, a partition plate 9, a side plate 10, a valve member 11, a solenoid type actuator 12, a piston rod 13, a supply aperture 14, a discharge channel 15, a dam mechanism 16, an auxiliary oil reservoir 17, a cooling fan 18, a bearing 19, a slip ring 20 and a brush 21.

That is, in the fluid clutch according to the present invention, the casing 3 of a large diameter and a small axial size is rotatably attached by way of the bearing 19 to the rotational shaft 2 which is driven rotationally by the driving section (engine) 1. The inside of the casing 3 is divided by the partition plate 9 and the side plate 10 into the torque transmission chamber 5 and the oil reservoir 6. A disk-shaped driving disk 4 is contained being secured to the end of the rotational shaft 2 in the torque transmission chamber 5. Further, the partition plate 9 is provided with a vane pump mechanism 8-1 as the pump mechanism 8 and the first flow channel 7a for sucking the oil in the torque transmission chamber 5 to the vane pump mechanism 8-1, and the side plate 10 is provided with the second flow channel 7b for sending the oil pressurized in the vane pump mechanism 8-1 to the oil reservoir 6.

The vane pump mechanism 8-1 comprises a rotor 8a and a vane 8b attached at the top end of the rotational shaft 2 and adapted to be driven rotationally due to a difference between the number of rotations of the casing 3 and that of the driving disk 4 (rotational shaft) caused by slippage.

The oil delivery channel of the vane pump mechanism 8-1 is connected to the flow channel 7b, and the first flow channel 7a is connected with an oil pumping channel of the pump mechanism, so that the oil in the torque transmission chamber is sucked by the vane pump mechanism 8-1 through the discharge channel 15 by way of the first channel 7a, while the oil pressurized by the pump mechanism is sent by way of the flow channel 7b to the oil reservoir 6.

The valve member 11 is made of an appropriate material selected from spring steel, stainless steel, spring-modified phosphor bronze, a metal material biased in one direction or like other material. The valve member 11 is secured at one end in the oil reservoir 6, for example, to the side plate 10 disposed in the oil reservoir 6 and covers at the other end the supply aperture 14 penetrating the side plate 10 and the partitioning plate 9 and in communication with the torque transmission chamber 5. The valve member 11 is adapted to be associated operatively with the piston rod 18 protruding from the solenoid type actuator 12 secured to the outer surface of the casing 3.

The electric current is supplied to the solenoid type actuator 12 by a circuit constitution comprising a slip ring 20 secured to the outer surface of the casing 8 on the side of the driving shaft and a brush 21 urged in a holder in the slip ring 20, for example, by a spring, and the brush 21 is electrically connected with a control unit comprising a microcomputer or the like (not illustrated). The control unit is adapted to send a valve opening/closing instruction to the solenoid type actuator 12 based on the output signal from the sensor for detecting, for example, the temperature of the cooling water in the driving section, the number of rotation of the engine, the vehicle speed or the opening degree of the throttle.

In the foregoing constitution, when the current supplied to the solenoid type actuator is interrupted by the instruction from the control unit, the piston rod 13 is operated in the opening direction by the resiliency of the valve member 11, by which the opening area of the supply aperture 14 is enlarged to increase the amount of the oil sent from the oil reservoir 6 to the torque transmission chamber 5. As the amount of the oil is increased, the torque transmission rate by the oil in the torque transmission chamber is increased and the number of rotations of the casing 3 is increased to accelerate the cooling fan 18.

On the contrary, when electric current is supplied to the solenoid type actuator 12 by the instruction from the control unit, the piston rod 13 operates in the closing direction against the resilient force of the valve member 11 to urge the valve member 11, so that the opening area of the supply aperture is narrowed or closed, by which the amount of the oil sent from the oil reservoir 6 to the torque transmission chamber 5 is decreased, or the oil delivery is interrupted. When the amount of the oil sent is reduced or the oil delivery is stopped, the amount of the oil in the torque transmission chamber 5 is decreased, by which the torque transmission rate is lowered, to lower the number of rotations of the casing 3 and decelerate the rotational speed of the cooling fan 18.

Thus, in the first embodiment, even when a great amount of oil is present in the torque transmission chamber 5, since the oil in the torque transmission chamber 5 is rapidly sucked or discharged even upon restarting and quick acceleration during running, the number of rotations of the cooling fan 18 is decreased and the noises are reduced as well to prevent wasteful consumption of fuels. Further, the pump mechanism can also send the oil to the oil reservoir 6 extremely rapidly and smoothly.

Figure 4:
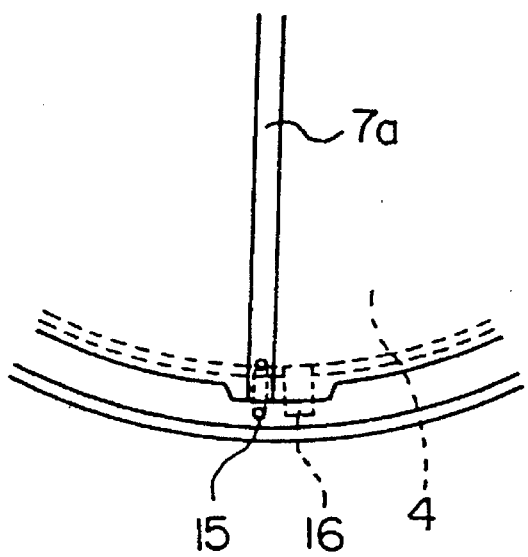
FIG. 4 is a view, corresponding to FIG. 3, illustrating another embodiment of a fluid clutch according to the present invention.

Then, in the second embodiment according to the present invention, as shown in FIG. 4, a dam mechanism 16 is disposed to the oil discharging section in the circumferential surface of the casing 3 for sending the oil toward the pump mechanism in the first flow channel 7a, in which the oil can be sent in a shorter period of time, being coupled with suction of the oil in the torque transmission chamber 5 by the vane pump mechanism 8-1. Although a dam of a general shape is illustrated, a dam of an L-shaped configuration or an U-shaped configuration may be formed for improving the oil sending function further.

Figure 5:
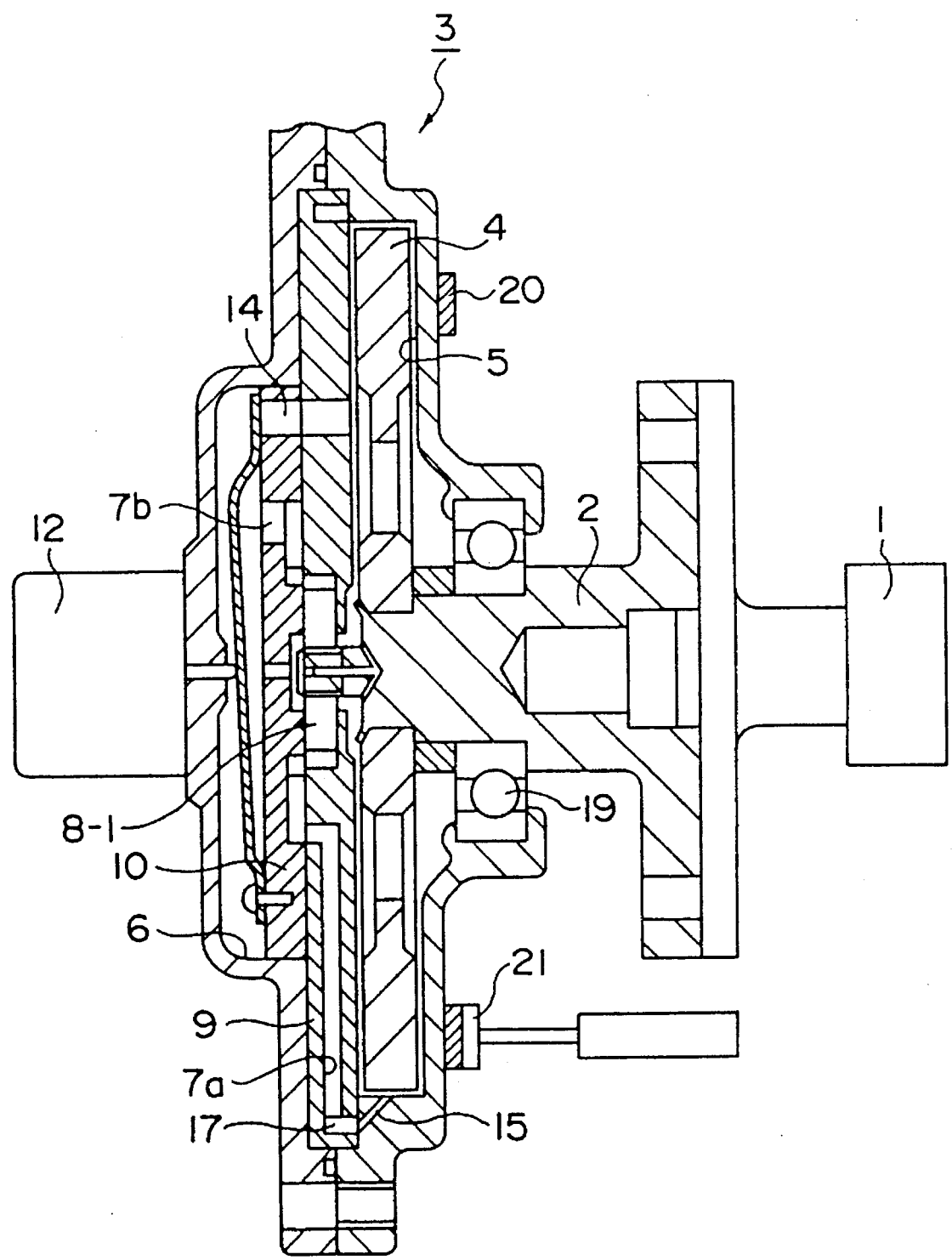
FIG. 5 is a partially cut away side elevational view in vertical cross section of a further embodiment of a fluid clutch according to the present invention.

Further, in a third embodiment of the present invention shown in FIG. 5, an auxiliary oil reservoir 17 is disposed to the outer circumferential surface of the casing 3 for temporally storing the oil to be sent to the vane pump mechanism 8-1. By the provision of the auxiliary oil reservoir chamber 17, even if an engine stops in an operative state where the valve member 11 opens (solenoid type actuator 12 is OFF) and a great amount of oil enters from the supply aperture 14 to the torque transmission chamber 5, since the oil enters by way of the discharge channel 15 into the auxiliary oil reservoir 17, the amount of the oil in the torque transmission chamber 5 is reduced to prevent occurrence of "co-rotating"

phenomenon more effectively which would otherwise result just after the restarting of the engine.

Other constitutions, functions and effects of the second and the third embodiments are the same as those in the first embodiment described previously.

Figure 8:
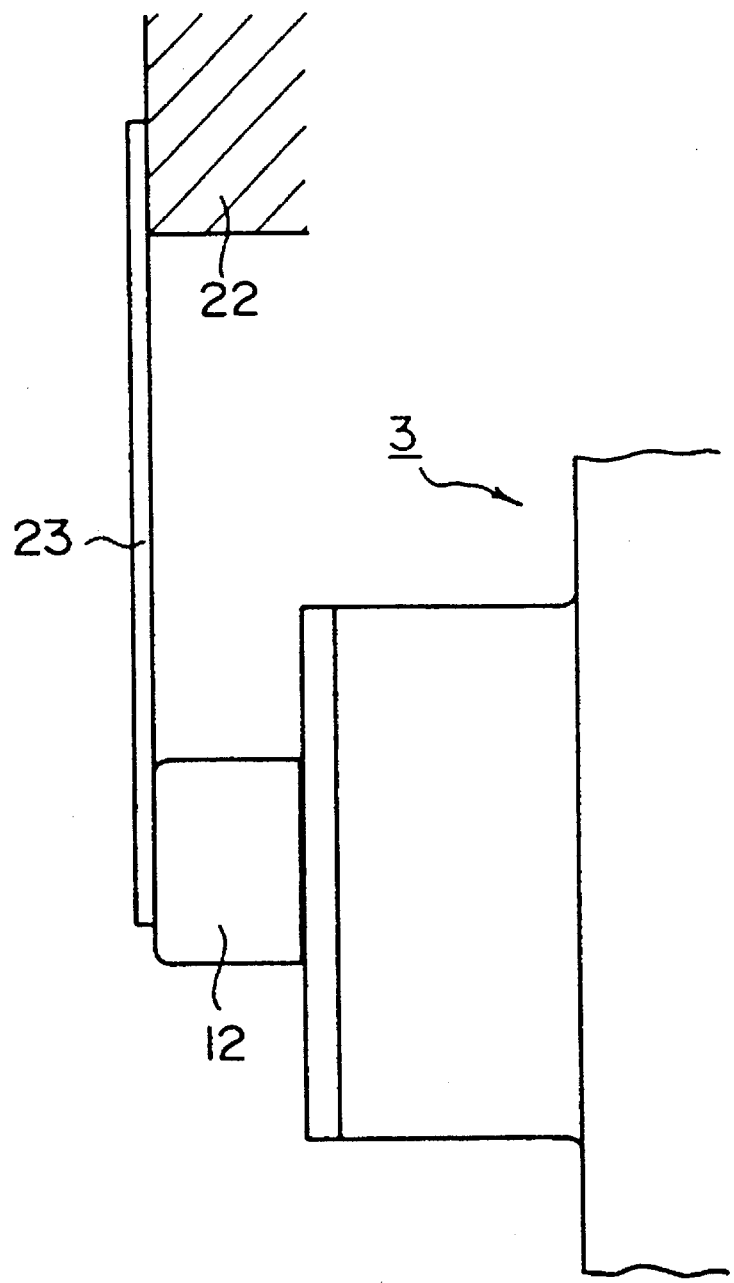
FIG. 8 is a side elevational view in vertical cross section for a main portion of the solenoid type actuator in a state attached to a car body.

Further, although the solenoid actuator 12 in this embodiment is attached integrally with the casing 3, it can also be secured to a separate member from the casing, for example, a base body 22, such as vehicle body, radiator, fan shroud or engine block by way of a connection member 23 such as a stay or bracket as shown in FIG. 8.

In this case, the slip ring 20 and the brush 21 for electric supply are no more required.

In each of the embodiments described above, the vane pump mechanism is illustrated as the pump mechanism, however a trochoide pump mechanism or a gear pump mechanism can also be used.

Figure 6:
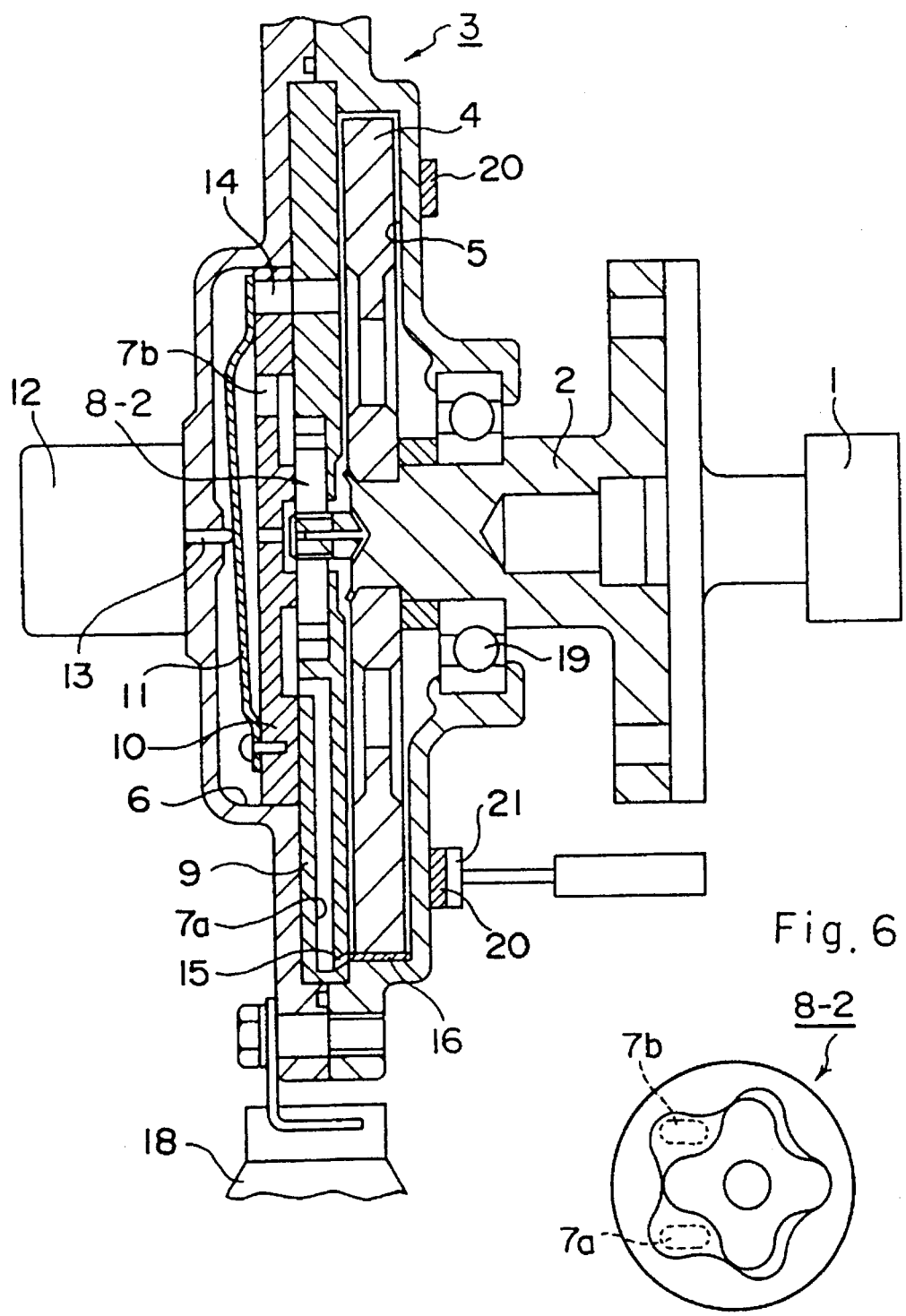
FIG. 6 illustrates a fluid clutch of the present invention using a trochoide pump for a pump mechanism in which (A) is a side elevational view in vertical cross section illustrating the entire constitution of the clutch and (B) is a schematic front elevational view of the trochoide pump.
Figure 6:
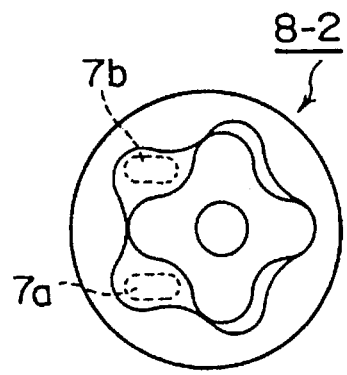

Referring, first, to a fluid clutch incorporated with a trochoide pump with reference to FIG. 6, the oil in the torque transmission chamber 9 is sucked or discharged by a trochoide pump mechanism 8-2 incorporated in the partitioning plate 9 through the discharge channel 15 and by way of the first flow channel 7a, while the oil pressurized in the pump mechanism is sent by way of the second flow channel 7b to the oil reservoir 6.

The trochoide pump mechanism 8-2 is adapted to be driven rotationally due to the difference of the number of rotations between the casing 3 attached to the top end of the rotational shaft 2 and the driving disk 4 (rotational shaft) caused by the slippage between them. The function of the trochoide pump-incorporated fluid clutch is identical with that of the vane pump mechanism-incorporated fluid clutch.

Figure 7A:
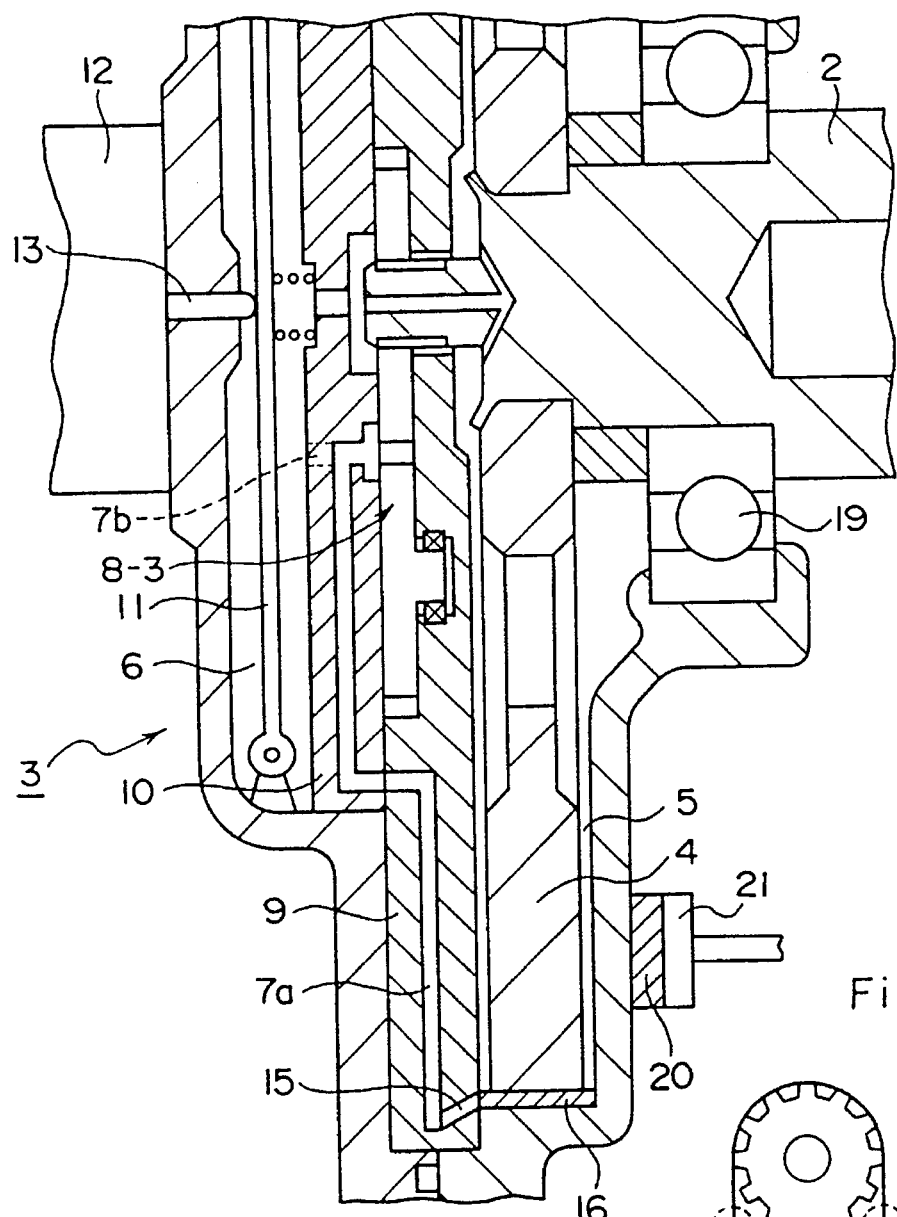
FIG. 7 illustrates a fluid clutch according to the present invention using a gear pump for the pump mechanism in which (A) is a partially enlarged front elevational view in vertical cross section showing a constitution of the clutch and (B) is a schematic front elevational view of the gear pump.
Figure 7B:
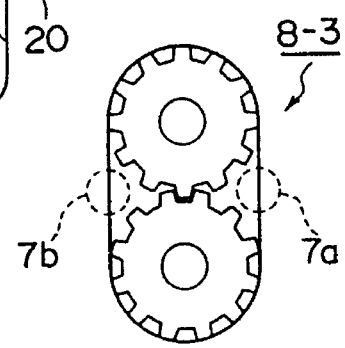

Then, in a case of the fluid clutch incorporated with the gear pump mechanism shown in FIG. 7, a gear pump 8-3 is assembled into a partitioning plate 9, in which the oil in a torque transmission chamber 5 is sucked and discharged by the gear pump mechanism 8-3 through a discharge channel 15 by way of a flow channel 7a, while the oil pressurized in the pump mechanism is sent by way of a second flow channel 7b into an oil reservoir 6.

While the trochoide pump mechanism is an inscribing gear pump, the gear pump mechanism shown in FIG. 7 is a circumscribing gear pump and accordingly, one of the gears is attached to a rotational shaft 2, while the other of the gears is supported by a bearing. The a gear attached to the top end of the rotational shaft 2 is adapted to be driven rotationally due to a difference between the number of rotations of the casing 3 and that of the driving disk 4 (rotational shaft) caused by slippage therebetween. The fluid clutch incorporated with the circumscribing gear pump mechanism also has the same function as the fluid clutch incorporated with the vane pump mechanism.

In the previous embodiment, the spring-controlled valve member 11 is used, whereas FIG. 7 shows an example of a coil spring pivoted at one end in the oil reservoir 6 and stretched between the surface opposing to the surface of the valve member against which the piston rod 13 is abutted and the side plate 10.

As has been described above, in the fluid clutch according to the present invention, since the oil in the torque transmission chamber can be sucked and discharged rapidly by the incorporated pump mechanism which is driven due to the difference of the number of rotation between the casing and the driving disk, even if a great amount of oil is present in the torque transmission chamber, for instance, "co-rotating" phenomenon upon restarting and upon quick acceleration during running can be prevented effectively. Further, since the oil supplied to the torque transmission chamber is controlled rapidly and at a high accuracy, the torque of the driving disk can be transmitted to the casing at an optimum state corresponding to various kinds of driving conditions, thereby enabling to reduce the fan noises and improve the fuel cost, as well as expect improvement for the accelerating performance. In addition, it can provide advantageous effect, for example, that the oil in the torque transmission chamber can be delivered in a shorter period of time under the effect of the dam mechanism and that occurrence of "co-rotating phenomenon" caused just after the restarting of the engine can be prevented more effectively by the effect of the auxiliary oil reservoir.

What is claimed is:

1. A fluid clutch comprising a driving section, a rotational shaft rotated by the driving section, a casing rotatably mounted concentrically around the rotational shaft, a partitioning member disposed in the casing for dividing the inside of the casing into a torque transmission chamber and an oil reservoir in which an oil is supplied, said partition member having a supply aperture formed therethrough for causing oil flow from the oil reservoir to the torque transmission chamber, a valve member for selectively opening and closing the supply aperture in the partitioning member, a solenoid-type actuator for operating the valve member, a driving disk securely mounted to the rotational shaft and disposed in the torque transmission chamber such that oil in the torque transmission chamber transmits torque from the driving disk to said casing, wherein the fluid clutch comprises a pump mechanism securely mounted to the rotational shaft for rotation therewith such that the pump mechanism rotates relative to the partitioning member of the casing due to a difference between the number of rotation of the rotational shaft and the number of rotation of the casing, a first flow channel extending through said partitioning member from the torque transmission chamber to the pump mechanism for sucking the oil in the torque transmission chamber toward the pump mechanism and a second flow channel formed in the partitioning member and extending from the pump mechanism to a location in the oil reservoir spaced from the valve member for sending the oil sucked by the pump mechanism into the oil reservoir.

2. A fluid clutch as defined in claim 1, wherein a dam mechanism is disposed in the inner circumferential surface of the casing for sending the oil toward the pump mechanism.

3. A fluid clutch as defined in claim 1, wherein an auxiliary oil reservoir is disposed in an outer circumferential surface of the casing for storing the oil to be sent into the pump mechanism.

4. A fluid clutch as defined in claim 1, wherein the solenoid type actuator is secured to the outer surface of the casing and supplied with electric current by way of a slip ring.

5. A fluid clutch as defined in claim 1, wherein the solenoid type actuator is secured to a base body spaced from the casing.

* * * * *